(12) United States Patent
Taketani et al.

(10) Patent No.: US 12,497,771 B2
(45) Date of Patent: Dec. 16, 2025

(54) FLUSH TOILET

(71) Applicant: TOTO LTD., Kitakyushu (JP)

(72) Inventors: Tomoyoshi Taketani, Kitakyushu (JP);
Katsumi Tanizawa, Kitakyushu (JP);
Takashi Matsusaki, Kitakyushu (JP);
Tsuyoshi Ozeki, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 134 days.

(21) Appl. No.: 18/515,438

(22) Filed: Nov. 21, 2023

(65) Prior Publication Data

US 2024/0209611 A1    Jun. 27, 2024

(30) Foreign Application Priority Data

Dec. 27, 2022   (JP) ................. 2022-210446

(51) Int. Cl.
*E03D 5/02* (2006.01)
*E03D 1/28* (2006.01)
*E03D 5/01* (2006.01)

(52) U.S. Cl.
CPC ............. *E03D 5/026* (2013.01); *E03D 1/283* (2013.01); *E03D 5/01* (2013.01)

(58) Field of Classification Search
CPC ........... E03D 5/026; E03D 1/283; E03D 5/01; E03D 1/012; E03D 1/26; E03D 1/38; E03D 11/13; E03D 1/33; E03D 1/34; E03D 5/00; E03D 11/06; E03D 11/14
See application file for complete search history.

(56) References Cited

U.S. PATENT DOCUMENTS

2021/0095450 A1*   4/2021   Kawazu ................. E03D 11/13

FOREIGN PATENT DOCUMENTS

| CN | 2880939 | 3/2007 |
|---|---|---|
| JP | S50027642 U | 3/1975 |
| JP | S50-38910 B1 | 12/1975 |
| JP | S54005958 U | 1/1979 |
| JP | 2010048042 A | 3/2010 |
| JP | 2017-48504 A | 3/2017 |
| JP | 2018-138757 A | 9/2018 |
| JP | 2020-117927 A | 8/2020 |
| WO | 2003016641 | 2/2003 |

OTHER PUBLICATIONS

Extended European Search Report issued in European Patent Application No. 23219692.3 mailed May 13, 2024.

* cited by examiner

*Primary Examiner* — Christine J Skubinna
(74) *Attorney, Agent, or Firm* — BakerHostetler

(57) ABSTRACT

A flush toilet is provided comprising a storage tank, a toilet body including a discharge trap, and an overflow channel causing flush water to overflow when the flush water within the storage tank exceeds a predetermined water level, the overflow channel is provided to connect the storage tank and a discharge flow channel downstream of a bent conduit of the discharge trap containing sealed water formed inside, and the storage tank includes a reservoir provided in a part of the storage tank to constantly reserve flush water regardless of toilet flushing, and a connecting flow channel provided upstream of the overflow channel to connect the reservoir and the overflow channel.

8 Claims, 6 Drawing Sheets

FLUSH TOILET

This application claims benefit of priority to Japanese Patent Application No. 2022-210446, filed on Dec. 27, 2022, the entire content of which is incorporated herein by reference.

BACKGROUND OF THE INVENTION

Field of the Invention

The present invention relates to a flush toilet, and particularly to a flush toilet which is flushed with flush water to discharge waste.

Description of the Related Art

Conventionally, as a flush toilet which is flushed with flush water to discharge waste, for example, Patent Document 1 (Japanese Patent Laid-Open No. 2017-48504), Patent Document 2 (Japanese Patent Laid-Open No. 2020-117927) and Patent Document 3 (Japanese Patent Laid-Open No. 2018-138757) describe a known flush toilet including a storage tank for storing flush water, a flush water supply flow channel extending from the storage tank to a toilet body, and an overflow channel causing flush water to overflow when the flush water within the storage tank exceeds a predetermined water level. First, the conventional flush toilet described in Patent Document 1 described above includes a main tank (lower tank) of the storage tank, a water receiving part provided above the lower tank (in an upper part of the storage tank), and an overflow channel (overflow pipe) connected to this water receiving part, and a reservoir (trap) provided in this overflow pipe and capable of reserving flush water only by a constant amount. Further, the flush water overflown from the water receiving part of the storage tank to the overflow channel fills the reservoir to form sealed water, and the sealed water in the reservoir blocks a flow channel within the overflow channel. Consequently, odor and foreign substances (insects, etc.) that have entered from downstream of the overflow pipe cannot intrude into the storage tank.

Next, in the conventional flush toilet described in Patent Document 2 described above, an overflow channel (overflow bypass flow channel) extending from an upper part of a storage tank configured to store flush water is connected to a discharge flow channel downstream of a portion containing sealed water formed within a discharge trap conduit. This overflow channel includes an odor backflow suppression part for suppressing backflow of odor and intrusion of pest, and this odor backflow suppression part inhibits the odor of the discharge flow channel downstream of the sealed water in the discharge trap conduit from intruding into the storage tank via the overflow channel. Further, in the conventional flush toilet described in Patent Document 3 described above, a toilet body includes a mud removal passage for discharging unhardened mud downward during cast molding. This mud removal passage connects a water passage provided upstream of a spouting hole of the toilet body and sealed water in a trap portion for discharging waste in a bowl, and the sealed water in the trap portion can prevent backflow of odor from downstream.

In the conventional flush toilet described in Patent Document 1 described above, however, the reservoir of the overflow channel connected to the water receiving part of the storage tank is provided above the lower tank constantly reserving water regardless of toilet flushing, and hence the reservoir of the overflow channel might be dried up (water dry-up) until the flush water in the water receiving part of the storage tank overflows to the overflow channel. Therefore, there is a problem that the reservoir cannot perform a water sealing function of blocking the intrusion of odor and foreign substances from downstream in the overflow channel. In recent years, in order to improve design and nursing care properties, there has been a growing need for so-called "low silhouette of the toilet" in which the whole flush toilet has a position of a height of its upper end set comparatively low. However, in the conventional flush toilet described in Patent Document 1 described above, since the reservoir of the overflow channel is connected to the water receiving part provided in the upper part of the storage tank, the reservoir is provided above the flush toilet and outside the storage tank, and the height of the upper end of the whole flush toilet is set to a comparatively high position. This causes a problem that the low silhouette of the toilet is hard to obtain and that the whole toilet enlarges. Furthermore, in order to obtain the low silhouette of the whole flush toilet, if the storage tank also has a position of a height of its upper end set low, a difference in height between the upper end of the storage tank and the upper surface of a rim of the toilet body, a rim spouting port or the like is reduced. This accordingly reduces a difference in height between a water supply part (water supply port) to supply flush water into the storage tank and an overflow port of the storage tank that causes the flush water within the storage tank to overflow to the overflow channel. There is also a problem that it is difficult to acquire a water supply space for supplying water from the water supply port into the storage tank and a spouting space for overflowing from the overflow port of the storage tank. In the conventional flush toilet described in Patent Document 1 described above, an installation space of the reservoir itself has to be acquired, and this causes a problem that the overflow channel is also complicated and that yield during manufacturing drops. Next, in the conventional flush toilet described in Patent Document 2 described above, since the overflow channel is connected to a discharge flow channel downstream of a portion containing sealed water formed within the discharge trap conduit. Therefore, depending on a connection point between the flow channels, there is a problem that the presence of the overflow channel is an element that causes drop in discharge performance of the discharge flow channel. Similarly, also in the conventional flush toilet described in Patent Document 3 described above, depending on a connection point between the mud removal passage in the toilet body and the sealed water of the trap portion, there is a problem that the presence of the mud removal passage causes a drop in discharge performance of the discharge flow channel.

Therefore, an object of the present invention, which has been made to solve the problems of the conventional technologies described above, is to provide a flush toilet capable of reliably preventing any odor, foreign substance or the like from being mixed in a storage tank from an overflow channel while acquiring the discharge performance of the toilet.

SUMMARY OF THE INVENTION

In order to solve the above-described problems, the present invention provides a flush toilet comprising: a storage tank configured to store flush water; a toilet body including a bowl configured to receive waste, a spouting port configured to spout flush water into the bowl, and a discharge trap that forms a part of a discharge flow channel for discharging waste in the bowl and includes an inlet connected to a lower portion of the bowl; a flush water supply flow channel extending from the storage tank to the toilet body, and an overflow channel configured to cause flush water to overflow when the flush water within the storage tank exceeds a predetermined water level, wherein the discharge trap further includes a bent conduit and a lowering conduit, the bent conduit forming the discharge flow channel lowering to a lowermost end behind and below the inlet and then rising to a top portion behind and above the lowermost end, and the lowering conduit forming the discharge flow channel lowering rearward and downward from the top portion of the bent conduit, and sealed water is formed within the bent conduit upstream of the top portion, the overflow channel is provided to connect the storage tank and the discharge flow channel downstream of the bent conduit, and the storage tank includes a reservoir and a connecting flow channel, the reservoir being provided in a part of the storage tank to constantly reserve flush water regardless of toilet flushing, and the connecting flow channel being provided in upstream of the overflow channel to connect the reservoir and the overflow channel. In the present invention including this configuration, since the overflow channel is provided to connect the storage tank and the discharge flow channel downstream of the bent conduit containing the sealed water formed in the discharge trap, odor, foreign substance or the like might be mixed in the overflow channel from the discharge flow channel downstream of the bent conduit of the discharge trap. However, according to the present invention, when flush water is supplied into the storage tank every toilet flushing, the flush water is replenished also in the reservoir being a part of the storage tank, and the flush water is thus constantly reserved within the reservoir (water is not dried up) regardless of the toilet flushing. Therefore, even if the odor, foreign substance or the like in the discharge flow channel is to be mixed in the reservoir through the connecting flow channel of the storage tank upstream of the overflow channel, the flush water within the reservoir can reliably prevent the odor, foreign substance or the like from being mixed inside. In addition, since the reservoir is provided in a part of the storage tank, complexity of the overflow channel can be suppressed without need to provide the reservoir in the overflow channel, and discharge performance can be acquired without need to provide any flow channel for supplying flush water to the reservoir in a portion related to the discharge performance (e.g., the discharge trap or the like). Consequently, the reservoir capable of inhibiting any odor, foreign substance or the like from flowing upstream of the discharge trap without being dried up can be provided while acquiring the spouting space for causing flush water to overflow from the storage tank, without need to provide any extra flow channel for supplying flush water in a portion related to discharge capacity. In this case, since the reservoir constantly reserving flush water regardless of toilet flushing is provided in a part of the storage tank, a space occupied by the whole storage tank can be suppressed, and the toilet can be achieved in lower silhouette, as compared with a case where the reservoir is provided separately from the storage tank. As a result, any odor, foreign substance or the like can be reliably prevented from being mixed in the storage tank from the overflow channel, while acquiring the discharge performance of the toilet.

In the present invention, preferably, the storage tank further includes a storage tank body including the reservoir provided inside, the reservoir includes a partition wall provided in an interior of the storage tank body, to divide the interior into a reservoir inner region constantly reserving flush water regardless of toilet flushing state and a reservoir outer region outside the reservoir inner region, and a side wall forming a part of the reservoir inner region and including an outflow port causing flush water in the reservoir inner region to flow out to the connecting flow channel, the reservoir outer region is connected to the flush water supply flow channel, and the partition wall has an upper end located below a stopped water level within the storage tank body prior to start of toilet flushing and located at and above an upper end of the outflow port. In the present invention including this configuration, since the upper end of the partition wall in the reservoir of the storage tank is located below the stopped water level within the storage tank body prior to the start of the toilet flushing and located at or above the upper end of the outflow port in the side wall of the reservoir, upon starting the toilet flushing a water level of the flush water in the storage tank body drops from the stopped water level down to a position of a height of the upper end of the partition wall. When the toilet is further flushed continuously, only the flush water in the reservoir outer region of the storage tank flows out from the flush water supply flow channel toward the toilet body, and the water level of the flush water in the reservoir outer region accordingly drops until the toilet flushing is ended. For the flush water in the reservoir of the storage tank connected to the connecting flow channel upstream of the overflow channel, a state where the flush water is reserved regardless of the toilet flushing (state where water is not dried up) is maintained, as the upper end of the partition wall of the reservoir is located at or above the upper end of the outflow port in the side wall. As a result, while acquiring toilet flushing performance, any odor, foreign substance or the like can be reliably prevented from being mixed in the reservoir from the overflow channel through the connecting flow channel of the storage tank upstream of the overflow channel.

In the present invention, preferably, the overflow channel includes a check valve configured to prevent backflow of flush water from the overflow channel to the connecting flow channel, mixing of odor, or intrusion of foreign substances such as insects. In the present invention including this configuration, since the check valve is provided in the overflow channel, this check valve can reliably prevent the backflow of flush water from the discharge flow channel to the overflow channel, mixing of odor or intrusion of the foreign substances such as the insects. Therefore, it is possible to prevent the flush water in the storage tank upstream of the overflow channel from being contaminated. Further, since the check valve is simply provided in the overflow channel, the complexity of the overflow channel can be suppressed.

In the present invention, preferably, the flush toilet further includes a discharge socket forming a discharge flow channel downstream of the lowering conduit of the discharge trap, the discharge socket includes a discharge unit connected to the overflow channel, and the discharge unit forms a part of the overflow channel and includes the check valve inside. In the present invention including this configuration, since the overflow channel is connected to the discharge unit of the discharge socket that is flexibly joined outside the toilet body, the height of the upper end of the whole flush toilet can be suppressed, and the toilet in the low silhouette can be achieved. Further, since the overflow channel is connected to the discharge socket downstream of the discharge trap of the toilet body, the flush water can flow out from the overflow channel to the discharge flow channel downstream with comparatively little impact on the discharge performance, and the discharge performance can thus be achieved.

In the present invention, preferably, the discharge unit is disposed above a position of the center of a cross section of a flow channel in the discharge flow channel formed by the discharge socket and includes a connecting portion connecting the overflow channel and the connecting flow channel, the connecting portion being disposed above a stopped water level within the storage tank. In the present invention including this configuration, the discharge unit is disposed above the position of the center of the cross section of the flow channel in the discharge flow channel formed by the discharge socket, and the connecting portion connecting the overflow channel in the discharge unit and the connecting flow channel of the storage tank is disposed above the stopped water level within the storage tank. Consequently, the discharge unit can be disposed in a portion of the discharge socket where flush water is hard to pass, and the discharge performance can be acquired.

In the present invention, preferably, the check valve includes a float structure configured to move upward and downward depending on a water level within the discharge unit. In the present invention including this configuration, since the check valve includes the float structure that moves upward and downward depending on the water level within the discharge unit, the check valve including the float structure can be reliably operated even in a state of flush water overflowing from the overflow channel in case of power failure, without need to electrically control an opening and closing operation of the check valve, or the like. Therefore, the overflown flush water can be reliably discharged from the discharge flow channel. In addition, the float structure of the check valve makes it possible to reduce the space occupied by the whole check valve due to its simple structure, so that a storage space for peripheral equipment of the discharge unit can be acquired.

In the present invention, preferably, the discharge socket includes a fixing portion configured to fix the discharge socket such that the discharge socket does not rotate relative to the toilet body in a circumferential direction about the center of a cross section of a flow channel in the discharge flow channel. In the present invention including this configuration, the fixing portion of the discharge socket can reliably fix the discharge socket such that the discharge socket does not rotate relative to the toilet body in the circumferential direction about the center of the cross section of the flow channel in the discharge flow channel. Therefore, the float structure of the check valve in the discharge unit of the drainage socket can be properly operated.

In the present invention, preferably, the flush toilet is a wall-mounted flush toilet including the toilet body fixed to a wall or cabinet located behind the toilet body. According to the present invention including this configuration, even in the wall-mounted flush toilet including the toilet body hard to be joined to the wall or cabinet behind the toilet body with fixing means or the like, overflow performance of flush water from the overflow channel can be acquired while achieving the low silhouette of the toilet.

According to the flush toilet of the present invention, odor, foreign substance or the like can be reliably prevented from being mixed in the storage tank through the overflow channel while acquiring the discharge performance of the toilet.

DETAILED DESCRIPTION OF THE PREFERRED EMBODIMENTS

Figure 1:
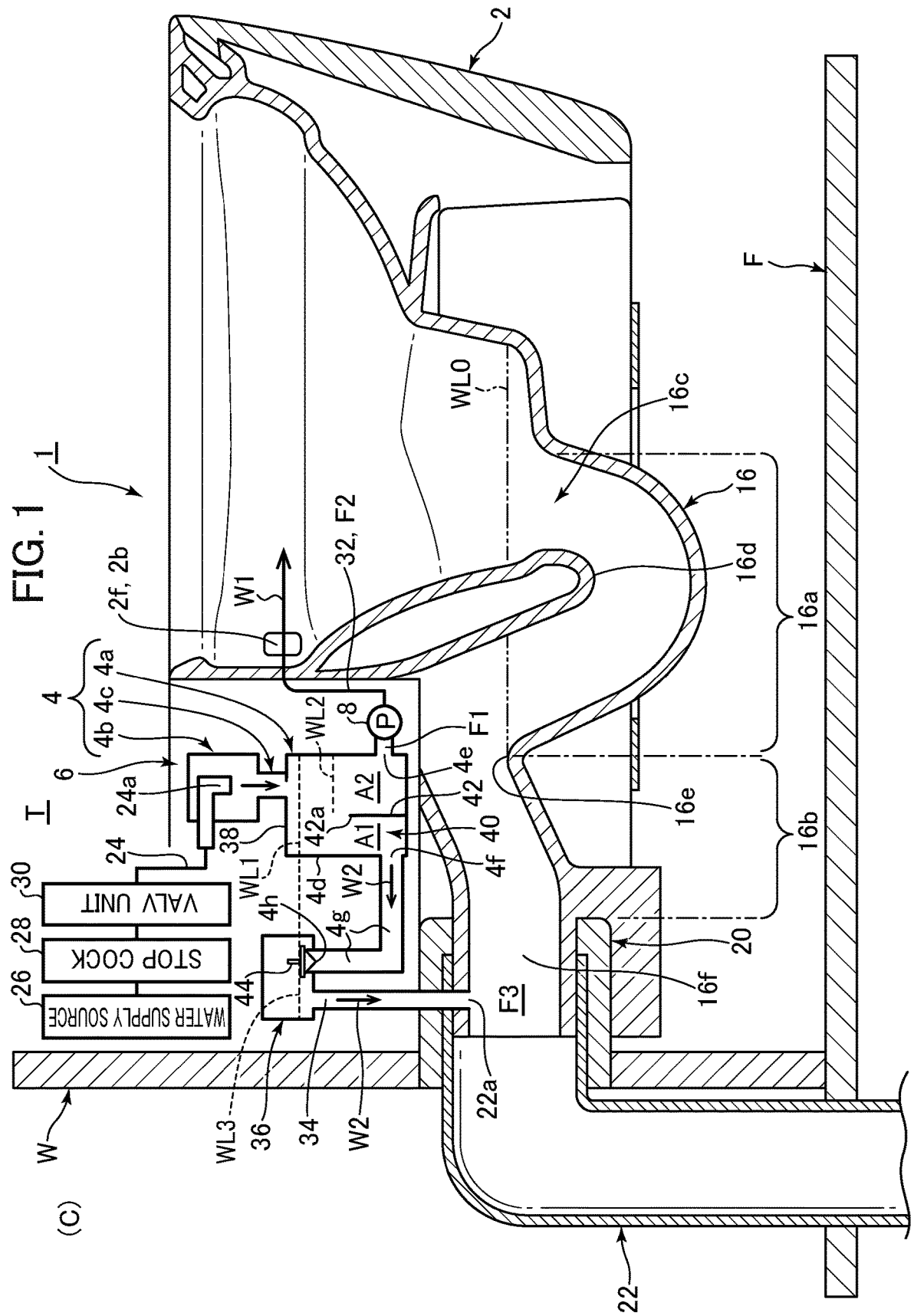
FIG. 1 is an overall configuration diagram of a flush toilet according to one embodiment of the present invention.

Hereinafter, a flush toilet according to one embodiment of the present invention will be described with reference to the accompanying drawings. First, as shown in FIG. 1, a flush toilet 1 according to the embodiment of the present invention is a so-called "wall-mounted flush toilet" including a toilet body 2 having a rear part fixed to a wall W of a toilet room T (or a front wall W of a cabinet C). Further, as shown in FIG. 1, the wall-mounted flush toilet 1 of the present embodiment includes the toilet body 2 made of ceramics, a tank device 6 including a storage tank 4 for storing flush water to be supplied to the toilet body 2, and a pump device 8 that is provided downstream of the tank device 6 and that pressurizes the flush water supplied from the storage tank 4 to supply the flush water to the toilet body 2.

Figure 2:
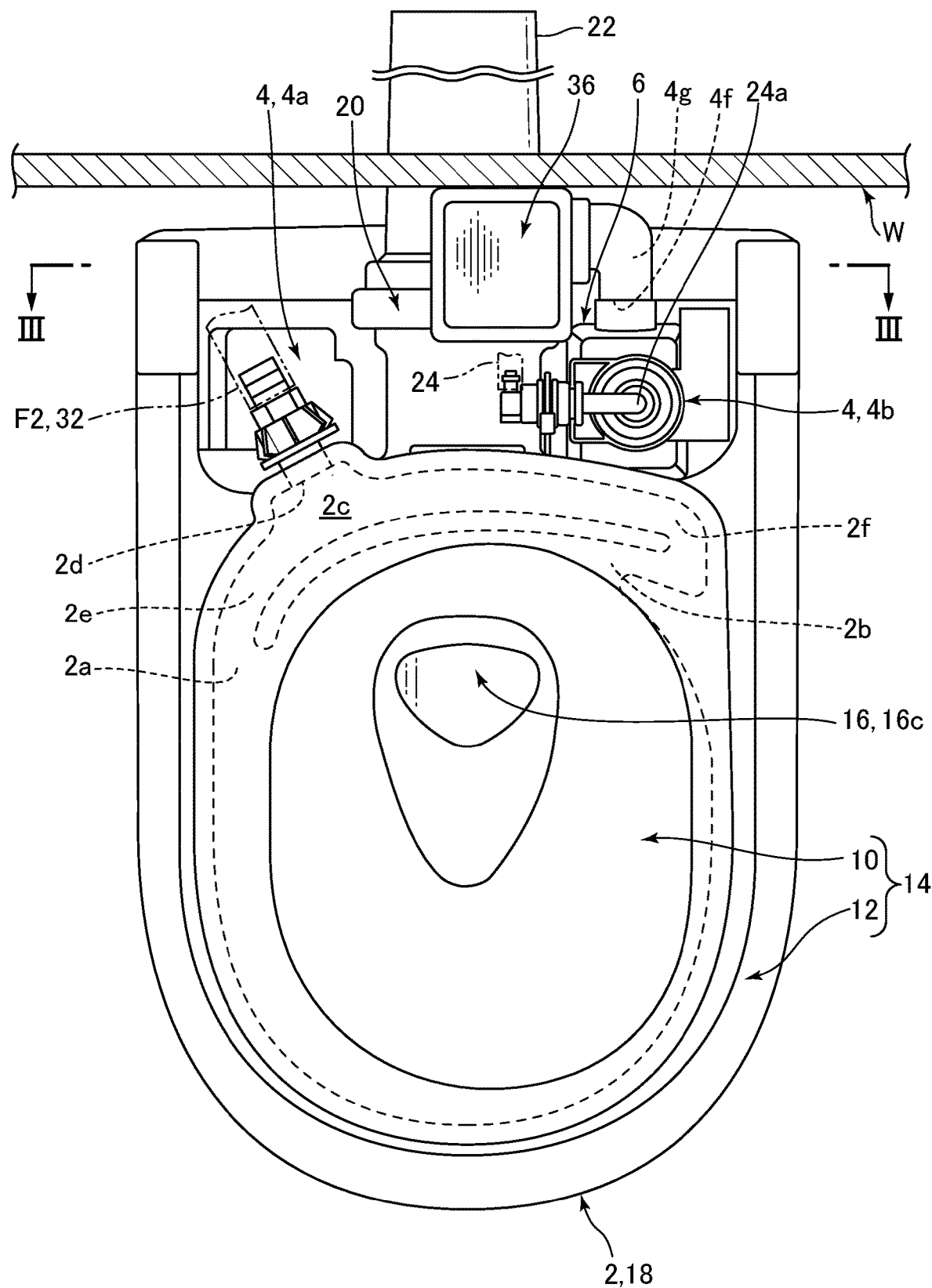
FIG. 2 is a plan view of the flush toilet according to the embodiment of the present invention.
Figure 3:
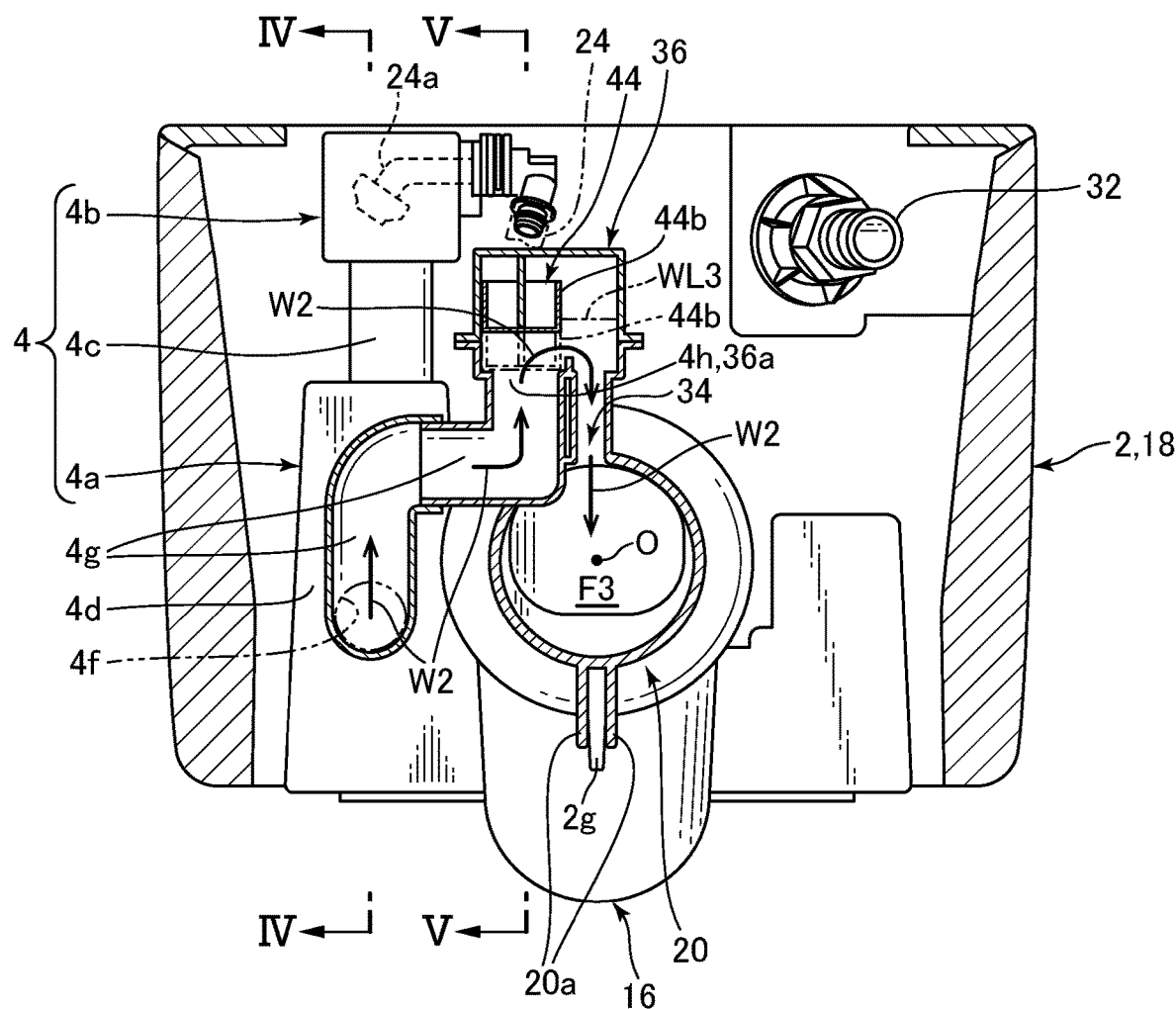
FIG. 3 is a cross-sectional view taken along the III-III line of FIG. 2.
Figure 4:
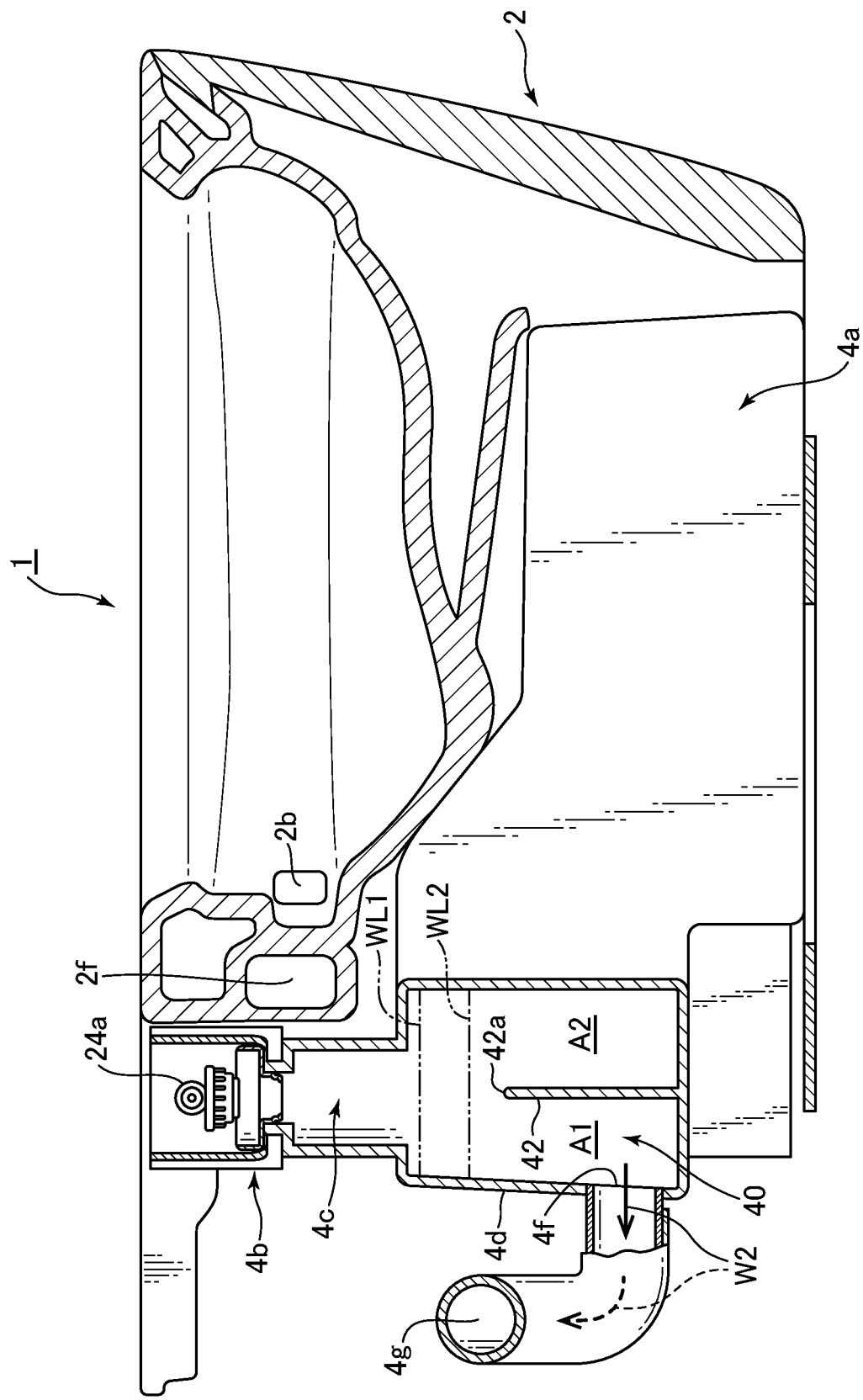
FIG. 4 is a cross-sectional view taken along the IV-IV line of FIG. 3.

Next, as shown in FIGS. 1 to 3, the storage tank 4 of the tank device 6 includes a main tank 4a incorporated below the toilet body 2, an auxiliary tank 4b incorporated behind and above the toilet body 2, and a coupling pipe 4b extending in an up-down direction to couple the main tank 4a and the auxiliary tank 4b. The main tank 4a and the auxiliary tank 4b communicate with each other in the up-down direction through the coupling pipe 4b. Further, the pump device 8 is incorporated in an interior of the toilet body 2 and communicates with the main tank 4a of the storage tank 4.

Next, as shown in FIGS. 1 to 3, the toilet body 2 specifically includes a bowl 14 including a waste receiving surface 10 that receives waste and a rim 12 that is formed on a top edge of the waste receiving surface 10. Also, the toilet body 2 includes a discharge trap 16 that forms a discharge flow channel for discharging waste in the bowl 14, and a skirt 18 formed to surround the bowl 14 and the discharge trap 16 from outside. Here, the skirt 18 is not limited to a skirt made of ceramics and formed integrally with the toilet body 2, and also includes a panel member or the like provided separately from the toilet body 2 and removably attached to the toilet body 2 to cover the toilet body from outside.

Next, as shown in FIGS. 1 to 3, the discharge trap 16 more specifically includes a bent conduit 16a and a lowering conduit 16b from upstream toward downstream. First, the bent conduit 16a of the discharge trap 16 includes an inlet 16c connected to a lower portion of the bowl 14, to form a discharge flow channel extending rearward and downward from the inlet 16c to a lowermost end 16d and then rising to a top portion 16e behind and above the lowermost end. Next, the flush toilet 1 of the present embodiment includes a discharge socket 20 connected downstream (rearward) of the discharge trap 16. The lowering conduit 16b of the discharge trap 16 forms a discharge flow channel lowering rearward and downward from the top portion 16e of the bent conduit 16a and then connecting to the discharge socket 20 rearward (downstream) of the top portion.

Here, as shown in FIG. 1, sealed water (sealed water surface WL0) is formed within a region upstream (forward) of the top portion 16e in the bent conduit 16a of the discharge trap 16. Further, as shown in FIG. 1, a discharge pipe 22 is installed backward of the wall W behind the toilet body 2 (or in the cabinet C). The discharge pipe 22 extends upward from below a floor surface F and is then directed toward the toilet body 2 (forward), the discharge pipe having an inlet 22a located at a front end (upstream end) of the discharge pipe and connected to an exit 16f at a rear end (downstream end) of the discharge trap 16 via the discharge socket 20.

Next, as shown in FIGS. 1 to 3, the tank device 6 includes a water supply pipe 24 connected upstream of the auxiliary tank 4b of the storage tank 4. The water supply pipe 24 has its most upstream side connected to an external water supply source 26 (see FIG. 1) such as water service. As shown in FIG. 1, in the water supply pipe 24, a stop cock 28 and a valve unit 30 are provided from a water supply source 26 side (upstream side) toward downstream. The valve unit 30, which is not specifically described, includes a fixed flow valve (not shown), a diaphragm valve (not shown) that is an on-off valve provided downstream of this fixed flow valve (not shown), an electromagnetic valve (not shown) for opening and closing this on-off valve (diaphragm valve), and others. As shown in FIGS. 1 to 3, a water supply nozzle 24a is provided at a downstream end of the water supply pipe 24. The water supply nozzle 24a is directed downward toward an interior of the auxiliary tank 4b of the storage tank 4 and serves as a water supply part that supplies flush water from the water supply pipe 24 into the storage tank 4. For example, when the electromagnetic valve (not shown) of the valve unit 30 is operated to open the diaphragm valve (not shown), the flush water supplied from the water supply source 26 into the water supply pipe 24 at water supply pressure of the water service or the like passes from the stop cock 28 to the fixed flow valve (not shown) of the valve unit 30, to adjust a flow rate constant, and then passes through the diaphragm valve (not shown). Then, the flush water passed through the valve unit 30 is supplied from the water supply nozzle 24a into the auxiliary tank 4b of the storage tank 4 and then into the main tank 4a through the coupling pipe 4c.

Incidentally, the flush water supplied into the main tank 4a is supplied toward the toilet body 2 by operating the pump device 8. More specifically, as shown in FIGS. 1 and 2, the toilet body 2 includes two rim spouting ports 2a and 2b (first rim spouting port 2a, second rim spouting port 2b) provided on left and right rims 12, respectively, and water (rim spouting water) is spouted from the respective rim spouting ports 2a and 2b into the bowl 14. As shown in FIGS. 1 to 3, a spouting pipe 32 is connected downstream of the pump device 8, and the spouting pipe 32 has a downstream end connected to an inlet 2d of a main water conduit 2c of the toilet body 2. Further, the main water conduit 2c of the toilet body 2 includes two rim conduits 2e and 2f (first rim conduit 2e, second rim conduit 2f) having a downstream side branched left and right, and the downstream sides of the respective rim conduits 2e and 2f are connected to the first rim spouting port 2a and the second rim spouting port 2b, respectively. As shown in FIGS. 1 and 2, in the flush toilet 1 of the present embodiment, a flow channel F1 extending to the pump device 8 from a first outflow port 4e of a side wall 4d in the main tank 4a of the storage tank 4 of the tank device 6, and a flow channel F2 extending from the pump device 8 through the spouting pipe 32 to the inlet 2d of the main water conduit 2c of the toilet body 2 serve as flush water supply flow channels for supplying flush water W1 for toilet flushing to the toilet body 2.

Next, as shown in FIGS. 1 to 3, the storage tank 4 further includes a second outflow port 4f provided separately from the first outflow port 4e in a part of the side wall 4d rearward of the main tank 4a, and a connecting flow channel 4g extending downstream from the second outflow port 4f and connected to a discharge unit 36 (described later in detail) of an overflow channel 34 (described later in detail). Details of an internal structure of the main tank 4a connected to the connecting flow channel 4g of the storage tank 4 will be described later. Further, the overflow channel 34 causes flush water W2 flowing out from the second outflow port 4f of the side wall 4d rearward of the main tank 4a through the connecting flow channel 4g to the overflow channel 34 to pass (overflow) directly from the discharge unit 36 to a discharge flow channel F3 within the discharge socket 20, when the flush water within the main tank 4a of the storage tank 4 exceeds a predetermined water level (overflow water level WL1) in case of an abnormality such as stop of the tank device 6 due to an operational defect of the device or power failure.

Next, the flush toilet 1 of the present embodiment includes a controller (not shown) that controls the operation of the pump device 8, and this controller (not shown) is disposed in a part of the toilet body 2. The tank device 6 includes a float switch (not shown) that detects the water level within the main tank 4a. Here, the opening and closing operation of the electromagnetic valve (not shown) of the valve unit 30 is controlled by the controller (not shown) based on the water level within the main tank 4a that is detected with the float switch (not shown). Further, the operation of the pump device 8 is also controlled by the controller (not shown) based on the water level within the main tank 4a that is detected with the float switch (not shown). For example, if the water level within the main tank 4a that is detected with the float switch (not shown) is equal to or less than a predetermined level, the electromagnetic valve (not shown) of the valve unit 30 is opened and the diaphragm valve (not shown) of the valve unit 30 is opened. The water supply pipe 24 is accordingly opened to supply water from the water supply nozzle 24a to the auxiliary tank 4b of the storage tank 4, and the flush water within the auxiliary tank 4b is stored in the main tank 4a through the coupling pipe 4c. Simultaneously, the pump device 8 is operated, and the flush water in the main tank 4a is pumped from the pump device 8 through the spouting pipe 32 to the main water conduit 2c of the toilet body 2, and then supplied from the respective rim conduits 2e and 2f to the respective rim spouting ports 2a and 2b. As a result, the toilet is flushed with rim spouting water from the respective rim spouting ports 2a and 2b, that is, so-called "toilet flushing with 100% of rim spouting water" is executed. When the water level within the main tank 4a reaches the predetermined water level, the electromagnetic valve (not shown) of the valve unit 30 is closed, and the diaphragm valve (not shown) is closed, thereby closing the water supply pipe 24 and stopping the pump device 8.

Next, with reference to FIGS. 1 to 6, the internal structure of the main tank 4a connected to the connecting flow channel 4g in the storage tank 4 of the flush toilet 1 of the present embodiment, and an internal structure of the overflow channel 34 and discharge unit 36 will be described in detail. First, as shown in FIGS. 1 to 5, the main tank 4a of the storage tank 4 further includes a storage tank body 38 that forms a body of the tank, and a reservoir 40 provided in a part of the storage tank body 38, to constantly reserve flush water regardless of toilet flushing. The reservoir 40 includes a partition wall 42 provided to extend upward from a bottom surface within the storage tank body 38. The partition wall 42 is a partition wall that divides the reservoir into a reservoir inner region A1 where flush water is constantly reserved regardless of toilet flushing state and a reservoir outer region A2 outside the reservoir inner region. As shown in FIG. 1, the first outflow port 4e of the main tank 4a is provided on the side wall 4d that forms the reservoir outer region A2 of the storage tank body 38. Thereby, the reservoir outer region A2 communicates with the flush water supply flow channel (flow channel F1) extending from the first outflow port 4e to the pump device 8. Here, an upper end 42a of the partition wall 42 in the reservoir 40 provided within the storage tank body 38 is set below a stopped water level WL2, prior to start of toilet flushing, that is lower than the overflow water level WL1 within the storage tank body 38, the upper end having a height set to be equal to or more than a height of an upper end of the second outflow port 4f of the main tank 4a.

Next, as shown in FIGS. 1 to 5, the connecting flow channel 4g of the storage tank 4 extends rearward from the second outflow port 4f provided on the side wall 4d rearward of the main tank 4a and is then bent upward to extend upward to the discharge unit 36. The discharge unit 36 of the overflow channel 34 is provided above the overflow water level WL1 within the main tank 4a and above an upper end of the storage tank body 38. Further, the discharge unit 36 has an interior forming a part of the overflow channel 34, and an upper end (downstream end) of the connecting flow channel 4g of the storage tank 4 connected to the discharge unit 36 forms an overflow port 4h. Here, the discharge unit 36 of the overflow channel 34 includes a connecting portion 36a connecting the overflow channel 34 and the connecting flow channel 4g, the connecting portion 36a being disposed above the stopped water level WL2 within the main tank 4a of the storage tank 4. Consequently, the overflow channel 34 has an upstream end connected as the connecting portion 36a of the discharge unit 36 to a downstream end (overflow port 4h) of the connecting flow channel 4g of the storage tank 4. The overflow channel 34 has a downstream end connected to the discharge flow channel F3 within the discharge socket 20 downstream of the bent conduit 16a and the lowering conduit 16b of the discharge trap 16 where sealed water (sealed water surface WL0) is formed.

Next, as shown in FIG. 3, the discharge socket 20 includes a fixing portion 20a fixing the discharge socket such that the discharge socket does not rotate relative to the toilet body 2 in a circumferential direction about the center O of a cross section of a flow channel in the discharge flow channel F3. The fixing portion 20a forms a pair of left and right projections projecting downward from a lower end of the discharge socket 20 to sandwich, from both left and right sides, an engaging projection 2g provided integrally on a rear part of the toilet body 2 and extending in a vertical direction. Thereby, the discharge socket 20 is fixed so as not to rotate relative to the toilet body 2.

Further, the discharge unit 36 of the overflow channel 34 is fixed to the discharge socket 20, also forms a part of the discharge socket 20, and is disposed above the center O (see FIG. 3) of the cross section of the flow channel in the discharge flow channel F3 extending in a front-rear direction within the discharge socket 20 and above a center axis C1 (see FIG. 5) of the discharge flow channel F3 passing the center O.

Figure 5:
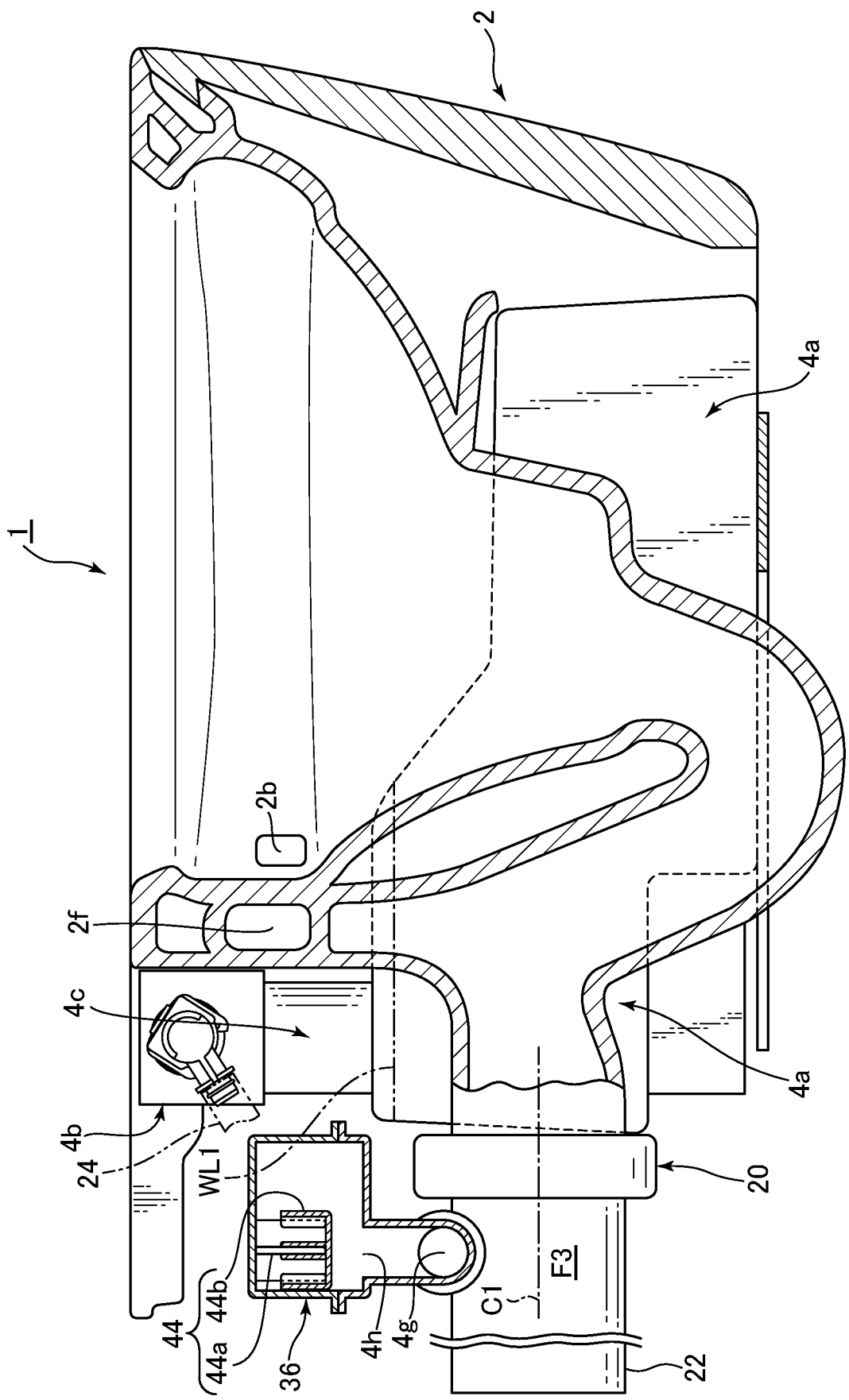
FIG. 5 is a cross-sectional view taken along the line V-V of FIG. 3.

As shown in FIGS. 1, 3 and 5, the discharge unit 36 of the overflow channel 34 includes a check valve 44 provided within the discharge unit, and the check valve 44 can prevent backflow of flush water from an overflow channel 34 side to the connecting flow channel 4g of the storage tank 4, mixing of odor, and intrusion of foreign substances such as insects.

Figure 6:
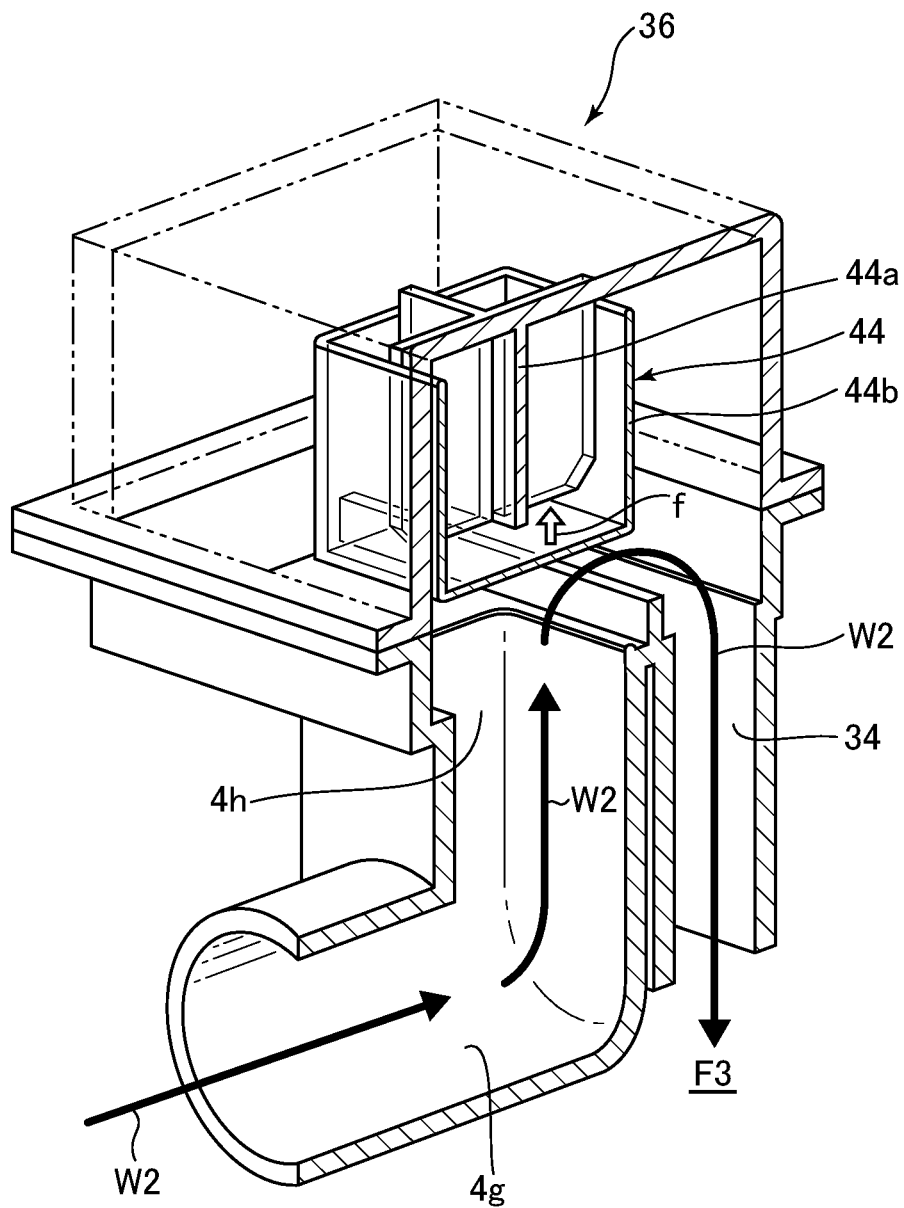
FIG. 6 is a schematic cross-sectional perspective view schematically showing an interior of a discharge unit of a discharge socket of the flush toilet according to the embodiment of the present invention.

Next, as shown in FIGS. 3, 5 and 6, the check valve 44 provided within the discharge unit 36 includes a guide wall portion 44a extending downward from a top surface within the discharge unit 36, and a valve body 44b vertically slidably attached to the guide wall portion 44a, the valve body moving upward and downward depending on a water level WL3 within the discharge unit 36. Further, the valve body 44b of the check valve 44 has a generally cup shape with an opening in an upper end portion of the shape and includes a float structure that moves upward and downward depending on the water level WL3 within the discharge unit 36. Consequently, during normal toilet flushing (during non-overflow), the discharge unit 36 is void of flush water, and buoyancy does not act on the valve body 44b of the check valve 44, so that the overflow port 4h is closed in a state where the valve body 44b is lowered to a lowermost position. In case of an abnormality such as stop of the tank device 6 due to an operational defect of the device or power failure, when the flush water within the main tank 4a of the storage tank 4 exceeds the predetermined water level (overflow water level WL1), the flush water W2 in the reservoir 40 of the storage tank body 38 flows out from the second outflow port 4f of the main tank 4a, and flows, as the overflown flush water W2, through the connecting flow channel 4g and the overflow port 4h into the discharge unit 36 of the overflow channel 34. Consequently, buoyancy f due to the overflown flush water W2 in the discharge unit 36 is generated for the valve body 44b of the check valve 44 in the discharge unit 36, so that the valve body 44b rises along the guide wall portion 44a to open the overflow port 4h. Therefore, the connecting flow channel 4g of the storage tank 4 and the overflow channel 34 downstream of the valve body 44b of the check valve 44 communicate, and the overflown flush water W2 flowing into the discharge unit 36 from the overflow port 4h is discharged from the overflow channel 34 to the discharge flow channel F3 within the discharge socket 20.

Next, with reference to FIGS. 1 to 6, the operation of the flush toilet 1 according to the embodiment of the present invention described above will be described. First, according to the flush toilet 1 of the embodiment of the present invention, since the overflow channel 34 is provided to connect the storage tank 4 and the discharge flow channel F3 within the discharge socket 20 downstream of the bent conduit 16a and the lowering conduit 16b where sealed water (sealed water surface WL0) is formed in the discharge trap 16, odor and foreign substance such as insects might be mixed in the overflow channel 34 from the discharge flow channel F3 within the discharge socket 20 downstream of the bent conduit 16a and the lowering conduit 16b of the discharge trap 16. However, according to the present embodiment, when flush water is supplied into the storage tank 4 every toilet flushing, the flush water is replenished also in the reservoir 40 of the main tank 4a that is a part of the storage tank 4, and the flush water is thus constantly reserved within the reservoir 40 (water is not dried up) regardless of the toilet flushing. Therefore, even if the odor, foreign substance or the like in the discharge flow channel F3 within the discharge socket 20 is to be mixed in the reservoir 40 from the overflow channel 34 through the connecting flow channel 4g of the storage tank 4 upstream of the overflow channel, the flush water within the reservoir 40 can reliably prevent the odor, foreign substance or the like from being mixed inside. In addition, since the reservoir 40 is provided in a part of the main tank 4a of the storage tank 4, complexity of the overflow channel 34 can be suppressed without need to provide the reservoir 40 in the overflow channel 34, and discharge performance can be acquired without need to provide any flow channel for supplying flush water to the reservoir 40 in a portion related to the discharge performance (e.g., discharge trap 16 or the like). Consequently, the reservoir 40 capable of inhibiting any odor, foreign substance or the like from flowing upstream of the discharge trap 16 and capable of preventing water from being dried up can be provided while acquiring a spouting space for causing flush water to overflow from the storage tank 4 (space required for the overflow channel 34, discharge unit 36 or the like), without need to provide any extra flow channel for supplying flush water in a portion related to discharge capacity. In this case, since the reservoir 40 constantly reserving flush water regardless of toilet flushing is provided in a part of the main tank 4a of the storage tank 4, less space can be occupied by the whole storage tank 4, and the flush toilet 1 can be achieved in lower silhouette, as compared with a case where the reservoir 40 is provided separately from the main tank 4a of the storage tank 4. As a result, any odor, foreign substance or the like can be prevented from being mixed in the storage tank 4 from the overflow channel 34, while acquiring the discharge performance of the flush toilet 1.

According to the flush toilet 1 of the present embodiment, since the upper end 42a of the partition wall 42 in the reservoir 40 of the main tank 4a of the storage tank 4 is located below the stopped water level WL2 within the storage tank body 38 prior to the start of the toilet flushing and located at or above an upper end of the second outflow port 4f of the side wall 4d of the reservoir 40, upon starting the toilet flushing the water level of the flush water in the storage tank body 38 drops from the stopped water level WL2 to a position of a height of the upper end 42a of the partition wall 42. Subsequently, when the toilet is further flushed continuously, only the flush water within the reservoir outer region A2 of the main tank 4a of the storage tank 4 flows out from the first outflow port 4e through the flush water supply flow channels F1 and F2 toward the toilet body 2, and the water level of flush water within the reservoir outer region A2 accordingly drops until the toilet flushing is ended. For the flush water within the reservoir 40 connected to the connecting flow channel 4g of the storage tank 4 upstream of the overflow channel 34, a state where flush water is reserved regardless of the toilet flushing (state where water is not dried up) is maintained, as the upper end 42a of the partition wall 42 of the reservoir 40 is located at or above the upper end of the second outflow port 4f in the side wall 4d. As a result, while acquiring toilet flushing performance, any odor, foreign substance or the like can be reliably prevented from being mixed in the reservoir 40 from the overflow channel 34 through the connecting flow channel 4g of the storage tank 4 upstream of the overflow channel.

According to the flush toilet 1 of the present embodiment, since the check valve 44 is provided in the overflow channel 34, the check valve 44 can reliably prevent backflow of flush water from the discharge flow channel F3 within the discharge socket 20 to the overflow channel 34, mixing of odor and intrusion of foreign substances such as insects. Therefore, it is possible to prevent the flush water within the storage tank 4 upstream of the overflow channel 34 from being contaminated. Further, since the check valve 44 is simply provided in the overflow channel 34, the complexity of the overflow channel 34 can be suppressed.

According to the flush toilet 1 of the present embodiment, since the overflow channel 34 is connected to the discharge unit 36 of the discharge socket 20 that is flexibly joined outside the toilet body 2, the height of the upper end of the whole flush toilet 1 can be suppressed, and the flush toilet 1 in the low silhouette can be achieved. Further, since the overflow channel 34 is connected to the discharge socket 20 downstream of the discharge trap 16 of the toilet body 2, flush water W3 can flow out from the overflow channel 34 into the discharge flow channel F3 within the discharge socket 20 downstream with comparatively little impact on the discharge performance, and the discharge performance can thus be acquired.

According to the flush toilet 1 of the present embodiment, since the discharge unit 36 is disposed above the position of the center O of the cross section of the flow channel in the discharge flow channel F3 formed by the discharge socket 20, and the connecting portion 36a connecting the overflow channel 34 in the discharge unit 36 and the connecting flow channel 4g of the storage tank 4 is disposed above the stopped water level WL2 within the main tank 4a of the storage tank 4, the discharge unit 36 can be disposed in a portion of the discharge socket 20 where flush water is hard to pass, and the discharge performance of the flush toilet 1 can thus be acquired.

According to the flush toilet 1 of the present embodiment, since the check valve 44 includes the float structure that moves upward and downward depending on the water level WL3 within the discharge unit 36, the check valve 44 including the float structure can be reliably operated even in a state of flush water overflowing from the overflow channel 34 in case of power failure, without need to electrically control an opening and closing operation of the check valve 44, or the like. Therefore, the overflown flush water W2 can be reliably discharged from the discharge flow channel F3 within the discharge socket 20. In addition, the float structure of the check valve 44 makes it possible to reduce the space occupied by the whole check valve 44 due to its simple structure, so that a storage space for peripheral equipment of the discharge unit 36 can be acquired.

According to the flush toilet 1 of the present embodiment, the fixing portion 20a of the discharge socket 20 can reliably fix the discharge socket 20 such that the discharge socket does not rotate relative to the toilet body 2 in the circumferential direction about the center O of the cross section of the flow channel in the discharge flow channel F3. Therefore, the float structure of the check valve 44 in the discharge unit 36 of the discharge socket 20 can be properly operated.

According to the flush toilet 1 of the present embodiment, even in the wall-mounted flush toilet 1 including the toilet body 2 hard to be joined to the wall W or cabinet C behind the toilet body 2 with fixing means or the like, overflow performance of the flush water W2 from the overflow channel 34 can be acquired while achieving the low silhouette of the flush toilet 1.

In the flush toilet 1 according to the embodiment of the present invention described above, the flush toilet including a form of so-called "wall-mounted flush toilet" has been described in which the toilet body 2 has the rear part fixed to the wall W of the toilet room T (or the front wall W of the cabinet C) and is disposed above the floor surface F, but is not limited to this form, and the present invention can be applied to a form of so-called "floor-mounted flush toilet" in which the toilet body 2 is disposed on the floor surface F. In the flush toilet 1 according to the embodiment of the present invention described above, a form of executing so-called "toilet flushing with 100% of rim spouting water" has been described, in which the rim spouting water only from the respective rim spouting ports 2a and 2b of the toilet body 2 is only used. The present invention can be applied to a form of executing so-called "toilet flushing by rim jet flushing", in which rim spouting water from the rim spouting ports of the toilet body 2 is used in combination with spouting water (jet spouting water) jetted, as flush water, rearward from a jet spouting port provided below and forward of the bowl 14 toward the inlet 16c of the discharge trap 16. Further, in the flush toilet 1 according to the embodiment of the present invention described above, since the reservoir 40 constantly reserving flush water regardless of toilet flushing is provided in a part of the main tank 4a of the storage tank 4, the flush water within the reservoir 40 can reliably prevent even the odor, foreign substance or the like in the discharge flow channel F3 within the discharge socket 20 from being mixed in the reservoir 40 from the overflow channel 34 through the connecting flow channel 4g of the storage tank 4 upstream of the overflow channel. Such a form of the flush water within the reservoir 40 that is capable of reliably preventing the odor, foreign substance or the like from being mixed inside has been described, but a check valve or the like may be provided in place of the reservoir 40.

Although the present disclosure has been explained with reference to specific, preferred embodiments, one of ordinary skill in the art will recognize that modifications and improvements can be made while remaining within the scope and spirit of the present disclosure. The scope of the present disclosure is determined solely by appended claims.

What is claimed is:

1. A flush toilet comprising:
   a storage tank configured to store flush water;
   a toilet body including a bowl configured to receive waste, a spouting port configured to spout flush water into the bowl, and a discharge trap that forms a part of a discharge flow channel for discharging waste in the bowl and includes an inlet connected to a lower portion of the bowl;
   a flush water supply flow channel extending from the storage tank to the toilet body, and
   an overflow channel configured to cause flush water to overflow when the flush water within the storage tank exceeds a predetermined water level,
   wherein the discharge trap further includes a bent conduit and a lowering conduit, the bent conduit forming the discharge flow channel lowering to a lowermost end behind and below the inlet and then rising to a top portion behind and above the lowermost end, and the lowering conduit forming the discharge flow channel lowering rearward and downward from the top portion of the bent conduit, and sealed water is formed within the bent conduit upstream of the top portion,
   the overflow channel is provided to connect the storage tank and the discharge flow channel downstream of the bent conduit, and
   the storage tank includes a reservoir where the flush water is stored from a state before toilet flushing begins until the state is restored after the toilet flushing is completed, and a connecting flow channel, and the connecting flow channel being provided in upstream of the overflow channel to connect the reservoir and the overflow channel,
   wherein an outflow port of the reservoir connected to an upstream end of the connecting flow channel is located at a position lower than a water level in the reservoir, and the overflow channel located downstream of the connecting flow channel has a portion higher than a stopped water level in the storage tank before the toilet flushing begins.

2. The flush toilet according to claim 1, wherein the storage tank further includes a storage tank body including the reservoir provided inside,
   the reservoir includes a partition wall provided in an interior of the storage tank body to divide the interior into a reservoir inner region constantly reserving flush water regardless of toilet flushing state and a reservoir outer region outside the reservoir inner region, and a side wall forming a part of the reservoir inner region and including an outflow port causing flush water in the reservoir inner region to flow out to the connecting flow channel,
   the reservoir outer region is connected to the flush water supply flow channel, and
   the partition wall has an upper end located below the stopped water level within the storage tank body prior to start of toilet flushing and located at and above an upper end of the outflow port.

3. The flush toilet according to claim 1, wherein the overflow channel includes a check valve configured to prevent backflow of flush water from the overflow channel to the connecting flow channel, mixing of odor, or intrusion of foreign substances such as insects.

4. The flush toilet according to claim 3, further comprising:
   a discharge socket forming a discharge flow channel downstream of the lowering conduit of the discharge trap, wherein the discharge socket is connected to a discharge unit via the overflow channel, and the discharge unit is connected to the storage tank via the connecting flow channel and includes the check valve inside.

5. The flush toilet according to claim 4, wherein the discharge unit is disposed above a position of a center of a cross section of the discharge flow channel extending tubularly in a front-rear direction and includes a connecting portion connecting the overflow channel and the connecting flow channel, the connecting portion being disposed above the stopped water level within the storage tank.

6. The flush toilet according to claim 5, wherein the check valve is provided at the connection portion and includes a float structure configured to move upward and downward depending on a water level within the discharge unit, and
   wherein the float structure includes a valve body disposed in the discharge unit so as to open and close an overflow port at a downstream end of the connecting flow channel, and the valve body is arranged so as to rise due to a buoyancy of the flush water flowing from the outflow port through the connecting flow channel into the discharge unit, thereby opening the overflow port and communicating the connecting flow channel with the overflow channel.

7. The flush toilet according to claim 6, wherein the discharge socket includes a fixing portion configured to fix the discharge socket such that the discharge socket does not rotate relative to the toilet body in a circumferential direction about the center of the cross section of the discharge flow channel.

8. The flush toilet according to claim 1, wherein the flush toilet is a wall-mounted flush toilet including the toilet body fixed to a wall or cabinet located behind the toilet body.

* * * * *